United States Patent [19]

Truett

[11] 3,960,740

[45] June 1, 1976

[54] ANTIFREEZE COMPOSITION

[75] Inventor: William Lawrence Truett, Blackwood, N.J.

[73] Assignee: PPG Industries, Inc., Pittsburgh, Pa.

[22] Filed: Jan. 4, 1974

[21] Appl. No.: 430,755

[52] U.S. Cl. .................................. 252/73; 252/77; 252/408
[51] Int. Cl.$^2$ ..................... C09K 50/00; C09K 3/00
[58] Field of Search ................. 252/70, 74, 75, 77, 252/78, 408, 71, 72, 73; 23/253 TP; 8/93

[56] References Cited
UNITED STATES PATENTS

| 1,911,195 | 5/1933 | Kepfer | 252/78 X |
| 2,373,570 | 4/1945 | Keller | 252/78 X |
| 2,384,553 | 9/1945 | Kiffer | 252/75 |
| 2,937,145 | 5/1960 | Cutlip et al. | 252/75 |
| 2,937,146 | 5/1960 | Cutlip et al. | 252/75 |

OTHER PUBLICATIONS

Hodgman, Charles D., *Handbook of Chemistry and Physics*, 25th Edition, Chemical Rubber Publishing Co., Cleveland, Ohio, pp. 1320–1322.

*Primary Examiner*—William J. Van Balen
*Attorney, Agent, or Firm*—Irwin M. Stein

[57] ABSTRACT

Antifreeze compositions are provided which contain glycol-water concentration indicators. When used in motor vehicle radiators, the indicators in the compositions enable the motorist at a glance to determine when the glycol level has been reduced. The indicators are colored moieties, i.e., dyes, which have at least one substituent which will give a differential solubility at different glycol-water concentrations. Preferred substituents are hydroxy groups and amino groups and the preferred colored moiety is an anthraquinone dye.

3 Claims, No Drawings

ANTIFREEZE COMPOSITION

BACKGROUND OF THE INVENTION

1. Field of Invention

This invention relates to antifreeze compositions and more particularly to such compositions suitable for use as coolants in internal combustion engines.

2. Description of the Prior Art

The ethylene glycol and similar polyhydric alcohol antifreeze solutions containing various corrosion inhibitors which are on the market today meet practically all of the requirements of a permanent coolant for internal combustion engines. Use of corrosion inhibitors has extended the useful life of the antifreeze solutions from one year to two years before being drained out of the engines cooling systems.

Corrosion inhibitors described in the art include sodium tetraborate (Kepfer, U.S. Pat. No. 1,911,195); sodium tetraborate with mercaptobenzothiazole (Keller, U.S. Pat. No. 2,373,570); and alkali metal tetraborate with an alkali metal phosphate (Kiffer, U.S. Pat. No. 2,384,553); and an alkali metal meta borate (Cutlip and Scheer, U.S. Pat. Nos. 2,937,145 and 2,937,146). Even though these compositions are adequate, a glycol-water concentration indicator has been discussed as a desirable feature for use in internal combustion engine coolants to control freezing point detection.

Some concepts which were thought to be suitable but which proved to be ineffective were indicators based on the phenomena of solvatochromism, hydrogen bonding and pH. Solvatochromism refers to the effect exhibited by some classes of dyes which change their color with changing solvents. In general, the color change exhibited is more satisfactory when solvents are of widely differing chemical nature such as aromatic hydrocarbons and ketones. With a solvent pair such as water and ethylene glycol, large color changes would not be expected to be encountered. In fact, two dyes, known to exhibit the effect, i.e., phenol blue and Quinoline yellow are ineffective.

The hydrogen bonding effect and pH effect are not suitable and effective means for indicating a shift in the water-glycol make-up.

SUMMARY OF THE INVENTION

According to the present invention there is provided in an antifreeze solution containing a polyhydric alcohol consisting of a glycol or glycerol and an effective amount of a corrosion inhibitor, the improvement which comprises the solution containing a glycol-water indicator which is a colored moiety having at least one substituent which will give a differential solubility between glycol-water at 50-50 volume percent and glycol-water at 33-67 volume percent, said indicator present in an amount sufficient to give a deep color at 50-50 volume percent.

DETAILED DESCRIPTION OF THE INVENTION

The present invention is directed to glycol-type antifreeze solutions that the user of a motor vehicle or a mechanic can examine and determine whether or not the glycol level in the solution has dropped to a level where the solution should be replaced or glycol added. This antifreeze solution is initially provided in concentrated form with some type of corrosion inhibitor, particularly one or more of an alkali metal borate, mercaptobenzothiazole and an alkali metal phosphate.

The alcoholic component used in the antifreeze solution is a water-soluble polyhydric alcohol such as ethylene glycol, propylene glycols, butylene glycols and glycerol. The antifreeze solution in undiluted form contains about 90 to 96% by weight of polyhydric alcohol. When put in use, the antifreeze solution normally contains a polyhydric alcohol-water ratio of about a 50-50 volume percent.

The quantity of corrosion inhibitor should be sufficient to be effective but will generally be in the range of 0.5 to 10% by weight of the polyhydric alcohol. While any of the inhibitors can be used alone, more than one inhibitor may be used.

The glycol-water indicator is a colored moiety (a dye nucleus) having at least one substituent, preferably at least two substituents, which will give a differential solubility between glycol-water at a 50-50 volume percent level and glycol-water at a 33-67 volume percent level. The dye is used at a level sufficient to give a deep color at the glycol-water level of 50-50 volume percent. However, a level of about 0.2 to 2 grams per gallon can generally be used. Normally a level of 0.5 to 1 gram per gallon is sufficient.

The dye nuclei which can be used are preferably selected from the group consisting of naphthaquinones, anthraquinones, quinones, phenanthraquinones, azo and triphenylmethanes. An anthraquinone dye is most preferred. The substituent groups useful on the dye nuclei are preferably —NH$_2$, —OH, —COOH, —OR, —NHR and

where R is alkyl of 1 to 4 carbon atoms, phenyl or benzyl, with —NH$_2$ and —OH being most preferred. A dye having at least difunctionality is preferred in order to give a sharp color change.

A particularly useful dye is 1,2-diamino anthraquinone.

Since temperature can effect some dyes, best results are obtained in determining color when the coolant is cool, i.e., less than 100°F.

The invention can be further understood by referring to the following examples in which parts and percentages are by weight unless otherwise indicated.

EXAMPLE 1

To two test tubes, each containing 10 ml. of antifreeze solution containing:

|  | Percent |
|---|---|
| Ethylene glycol | 95 |
| Sodium tetraborate | 2 |
| Sodium hydroxide | 0.5 |
| Sodium mercaptobenzothiazole | 0.2 |
| Water | 2.3 |
|  | 100.0 | was added 2 mg. 1,2-diamino anthraquinone of dye (corresponds to 0.8 g. per gallon). After standing for about 10 minutes, 10 ml. of water was added to one tube, giving 50/50 glycol/water by volume and 20 ml. of water was added to the other, giving 33/67 glycol/water by volume. The tubes were heated to 95°C. in a hot water bath for 10 minutes and allowed to cool. Differences in solution colors were noted by eye on both the hot and cold solutions. The dye 1,2-diamino anthraquinone was selected for actual radiator testing.

EXAMPLE 2

With about one dozen cars, the radiators were backflushed leaving the cooling system containing essentially all water. To the radiators were added 2 gallons of the antifreeze solution of Example 1 which contained 0.8 g./gal. of 1,2-diamino anthraquinone.

In a second procedure, also with about one dozen cars, the radiators were drained, water added and the cars run for 10–15 minutes until hot. The radiators were then again drained, 2 gallons of the above antifreeze solution added and the radiators filled with water.

In a third procedure with a dozen cars, the radiators were simply drained, 2 gallons of the above antifreee solution added and the radiators filled with water. In all cases, the glycol/water ratio was about 50/50 volume percent and the solution had a deep red color.

Most of the cars were on test for less than 90 days. Twice during this period of time, groups examined the contents of the radiators, but prior to each examination, 3 or 4 cars had the antifreeze solutions in their radiators reduced to a 33/67 glycol/water ratio by volume and 3 or 4 cars left at the 50/50 ratio. The majority of each panel could visually distinguish a color difference in the solutions when samples of solutions were removed from the radiators by pipettes.

What is claimed is:

1. In an undiluted antifreeze solution containing polyhydric alcohol selected from the group consisting of ethylene glycol, propylene glycols, butylene glycols and glycerol, an effective amount of corrosion inhibitor and a dye, the improvement which comprises using as the dye, 1,2-diamino anthraquinone, said dye being present in said antifreeze solution in an amount that is sufficient to give a deep color when said solution is diluted with water to a polyhydric alcohol-water solution of 50-50 volume percent.

2. The antifreeze solution of claim 1 wherein the polyhydric alcohol is ethylene glycol and from 0.2 to 2 grams per gallon of antifreeze solution of 1,2-diamino anthraquinone is used.

3. The antifreeze solution of claim 2 wherein the antifreeze solution contains from about 90 to 96 weight percent ethylene glycol and alkali metal tetraborate corrosion inhibitor.

* * * * *